Figure 1:
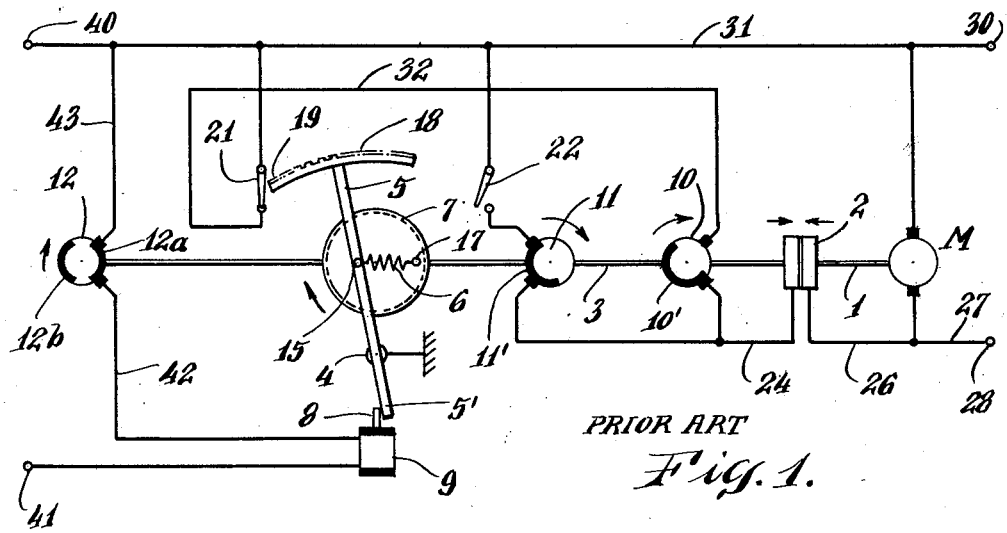

June 2, 1964

T. GEVATTER 3,135,181

CIRCUIT ARRANGEMENT FOR ELECTRICALLY
OPERATED REPETITIVE STILL CAMERAS
Filed Dec. 8, 1960

THEO GEVATTER
INVENTOR.

United States Patent Office 3,135,181
Patented June 2, 1964

3,135,181
CIRCUIT ARRANGEMENT FOR ELECTRICALLY OPERATED REPETITIVE STILL CAMERAS
Theo Gevatter, 19 Nellenbachstrasse, Uberlingen (Bodensee) Germany
Filed Dec. 8, 1960, Ser. No. 74,715
6 Claims. (Cl. 95—11)

This invention relates to a circuit arrangement for electrically operated repetitive still cameras. More explicitly, the invention is concerned with improving such a circuit arrangement to effect a faster recycling time, thereby allowing a greater number of still photographs to be taken in any given time as compared to previously known circuit arrangements.

The invention is exemplified in a sequence camera of the type having a non-cyclical but repetitive shutter which is made to open and close by means of a single movement of a shutter actuator. The shutter actuator is mechanically driven by a spring, periodically tensioned by means of a constantly rotating motor through an intermittently-engaged electromagnetic clutch, so that the torque of the motor may be intermittently applied to tension the spring. In such arrangements, the clutch is controlled by an electric circuit so that the spring is tensioned while the circuit thereto is closed; and upon complete tensioning of the spring, the electromagnetic clutch circuit is opened so that the motor is disconnected from the spring. In earlier arrangements, the control circuit for the electromagnetic clutch has been, at least in part, switched by contacts operated by the shutter actuator itself; therefore, the circuit of the electromagnetic clutch is closed only after the shutter has fired or run-down.

One disadvantage of such an arrangement is that the retensioning of the spring by the electric motor starts only after the shutter actuator has completed its movement (i.e., after the shutter has completely traveled from one to the other rest position). Further, if the shutter-actuating system is of the type in which each back and forth linear sweep of the actuator makes an exposure, then two different control switches must be closed by the shutter actuator in its two different end positions. Another disadvantage of such a system is that any malfunction in the mechanical elements of the control or shutter actuator elements will cause a stopping of the entire mechanism in a position between its ready-to-fire and just having "taken" positions. This means that in order to prepare the camera for another exposure the whole mechanism must be reset by hand to its starting position before the camera can function semiautomatically.

In order to alleviate the aforementioned three disadvantages, the present invention accomplishes the controlling of the electromagnetic clutch by a circuit means which is not controlled by the position of the mechanical shutter actuator; but rather is controlled by more direct means, so that (1) the retensioning of the shutter spring may be started before the shutter has completely run down; (2) a shutter and shutter-actuator of the double firing type (i.e., which opens and closes twice for each back and forth movement of the shutter actuator) requires only one circuit-closing mechanism; and (3) the switching of the electromagnetic clutch is sufficiently independent of the shutter actuator and other mechanical elements that sticking or other mechanical malfunction thereof does not affect the switching arrangement. Because of these three advantages, the tensioning of the shuttter spring may be started befoer the shutter has completely run down, the circuit is simplified by the use of a single rather than two switches, and a single malfunctioning or misfiring does not stop the camera in such a position that it cannot be refired without manual attention.

An object of the invention is, therefore, the provision of a camera control circuit arrangement which has each and every of the following advantages over previous arrangements: (1) more rapid tensioning of the shutter spring; (2) greater simplicitly of parts; and (3) the ability to recover and be used after a malfunctioning of the mechanical parts of the shutter drive.

Figure 2:
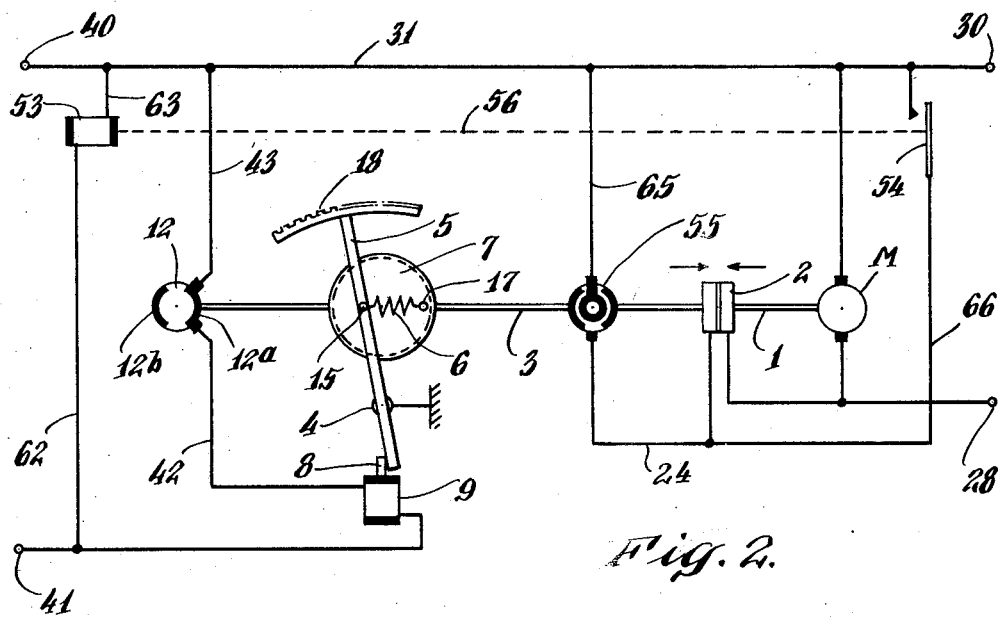

Other objects and advantageous characteristics of the invention will become obvious to one skilled in the art upon reading the following specification and upon studying the accompanying drawing in which:

FIG. 1 is a schematic diagram of a previously known shutter control arrangement; and FIG. 2 is a schematic drawing of the invention, showing the entire shutter control arrangement including the novel control circuit means for the electromagnetic clutch.

In the known arrangement of FIG. 1 constantly operating electric motor M drives, through motor shaft 1 and electromagnetic clutch 2, control shaft 3. This control shaft 3 drives switches 10, 11 and 12, the function of which will be hereinafter explained, and also drives shutter spring tensioning wheel 7. It should be noted that switches 10, 11 and 12 and tensioning wheel 7 are illustrated as if they are individual shafts, separately engaged by control shaft 3. Actually, these elements are preferably mounted on the same shaft (3); but they have been illustrated as if on separate cross-shafts for the purpose of showing their structure and relative positions in one figure. Similarly, motor M may be coaxial with shaft 1. Tension wheel 7 is connected to the shutter actuator 5 by means of the tension spring 6, the latter being connected to tension wheel 7 at 17 and to the shutter actuator 5 to 15. This shutter actuator 5 is fulcrumed at 4 and carries at one extremity toothed segment 18; this toothed segment operates a shutter of the Venetain blind (or louvre) type (not shown). In such a known shutter a series of slat-like elements, similar to Venetian blinds, are pivoted about their own longitudinal axes so that rotation of a series of such parallel slats will cover and uncover an aperture, thereby functioning as a shutter. The toothed segment 18 engages a series of small pinions, each of which is connected to one of the slats of such a Venetian blind shutter, so that the movement of the toothed segment in one direction rotates the slats 180° about their longitudinal axes from a closed through a fully opened and then to a fully closed position.

The shutter actuator 5, 18 is shown in FIG. 1 in a left (shutter-closed) position, and is held in such position against the tension of spring 6 by means of stop element 8 acting on the lower end 5' of said shutter actuator. This stop 8 is the armature of electromagnet 9. In this position, toothed segment 18 is strongly biased towards the right but is unable to move because of stop 8. At the same time, the left extremity 19 of shutter segment 18 holds switch 21 closed, thereby attempting to close the circuit which starts at main terminal 30, through wire 31, switch 21, wire 32 and then to one contact terminal of the previously mentioned switch 10. Switch 10, however, is in an open position therefore breaking the circuit through wire 24 to the left side of electromagnetic clutch 2, the right side thereof being connected through wires 26, 27 to the other main terminal 28. Therefore, electromagnetic clutch 2 is not energized, so that motor shaft 1 does not drive control shaft 3. On the other hand, the second shutter controlled switch 22 is open so that although the rotary contact 11' of second control shaft switch 11 is closed, the circuit through the electromagnetic clutch 2 is not completed by this path either. Therefore, electromagnetic clutch 2 is not engaged and the control shaft 3 is at rest, even though motor M is rotating motor shaft 1.

In this position switch 12 is in one of its two "on" positions so that an external energizing pulse, applied across contacts 40 and 41, would travel through wires 42 and 43 and contact 12a of switch 12 to energize electromagnet 9 thereby retracting stop element 8 and allowing the shutter actuator 5 to swing to the right. Thus, such a pulse will cause the shutter segment 18 to be moved to the right by the tension of spring 6, thereby rotating the Venetian blind shutter slats through 180°, thus effecting an exposure. Upon the shutter segment reaching the righthand end position, switch 22 will be closed, thereby completing a circuit through electromagnetic clutch 2 by means of wire 24, rotary contact 11' of switch 11, switch 22 and wire 31. This will engage the electromagnetic clutch so that control shaft 3 will begin to rotate to move pivot point 17 around toward the left, thus retensioning spring 6 to bias the shutter actuator 5 back to the left-hand position (i.e., the one shown in FIG. 1). In the meantime, however, stop element 8 has fallen behind (i.e., to the right) of the lower end 5' of shutter actuator 5. Therefore, although the end 17 of spring 6 has moved 180° so that spring 6 strongly biases the shutter actuator to the left, the shutter actuator 5 is, nevertheless, held in the right-hand-most position.

Since movement of the control shaft 3 eventually moves the contact 11' of switch 11 to the open or "off" position, the circuit through switch 22 and 11 is broken. Further, since shutter control switch 21 has been allowed to open by the movement of shutter actuator segment 18 towards the right, the circuit through the conact 10' of switch 10 is broken so that this switching branch is also in an open position. Therefore, electromagnetic clutch 2 becomes de-energized as the control shaft turns and therefore the latter stops with tension wheel pivot point 17 at the left. During this 180° rotation of shaft 3, synchronizing switch 12 has turned so that its contact 12a has moved 180° to the position occupied by contact 12b in FIG. 1; but, at the same time, contact 12b has moved into the position shown at 12a, thereby resetting the potential circuit from terminal 40 to wires 43 and 42 through electromagnet 9 to contact 41. Therefore, the camera control arrangement is ready to operate again and will be fired by the application of an electrical pulse across terminals 40 and 41.

The operation of the entire mechanism on the return stroke of shutter actuator 5, 18 is of course substantially the same except for being in the opposite sense. Thus, upon energizing electromagnet 9, stop 8 will be released, allowing the shuter actuator to operate, thus opening switch 22; but switch 21 will not close until the shutter actuator 5, 18 has reached its extreme left-hand position (i.e., the one shown in FIG. 1). At this point, contact 10' of switch 10 bridges the two terminals from wires 31 and 24 so that upon the closing of switch 21 by the shutter segment 18 reaching its extreme left-hand position, the electromagnetic clutch 2 will engage; therefore, shaft 3 starts and continues to rotate until the contact 10' has once again rotated almost to the position shown in FIG. 1, thereby disconnecting the power to clutch 2. As seen in FIG. 1, the switch contact 10' actually passes through (in a clockwise direction) the disconnect position and rotates approximately 40° or so beyond the disconnect position before actually stopping. This is, of course, an inertia or overrun effect and is taken into consideration in designing the length of the contact 10' as well as the corresponding contact 11' of switch 11.

As previously stated, the disadvantages of this prior art system are threefold. First, shutter segment 18 does not close the respective switch 21 or 22 (thereby initiating the retensioning of shutter spring 6) until the shutter actuator has completed one of its cycles from left to right or right to left. This means that the retensioning of the shutter spring cannot commence until the shutter has completely run down, thereby limiting the repetitive rate of operation of this prior art shutter mechanism. Secondly, in the type of shutter actuator shown (i.e., a Venetian blind actuator of the segment type), the fact that the shutter actuator opens and closes the shutter upon each linear sweep from one extreme position to the other necessitates the use of two switches (i.e., switch 21 and switch 22). Further, two rotary switch members (10, 11) are required as well, so that the total number of elements involved is double for such a half-cycle shutter actuator. This, of course, leads to the possibility of mechanical malfunction of the apparatus if any of these switches should break down. Thirdly, should any mechanical malfunction occur in the shutter or shutter actuator part of the system, it is possible that the shutter actuator 18 may "hang" out of contact with either of switch 21 or 22; and this would make it impossible for the electromagnetic clutch 2 to be energized to reset the shutter spring 6. Further, any malfunction in the control shaft 3 could also "hang" the rotary switches 10 and 11 in positions other than those shown in FIG. 1 (or in an 180° different position), thereby also rendering the system inoperative even though a firing pulse should be applied across terminals 40, 41. Even more important, the contacts 12a and 12b of switch 12 would also be hung between their two operative positions so that an applied pulse across terminals 40 and 41 could not actuate the shutter even if the shutter were at one of its extreme (i.e., read) positions.

The control circuit of the invention, as seen in FIG. 2, obviates all of these disadvantages of the prior art circuit of FIG. 1. The FIG. 2 elements common to the prior art arrangement of FIG. 1 have been numbered with the same numbers so that only the new elements have been differently referenced. These new elements include switch 54, solenoid 53 and double rotary switching element 55. The elements eliminated in the invented arrangement include both of switches 21 and 22 and the pair of rotary switches 10 and 11. In the new arrangement, motor shaft 1 drives shaft 3 through electromagnetic clutch 2 thereby rotating tension wheel 7 to tension spring 6 for biasing shutter actuator 5 in substantially the same manner as in the prior art arrangement of FIG. 1. However, the switching control for the electromagnetic clutch 2 is quite different as will hereinafter appear. As in the FIG. 1 arrangement, tension wheel 7 and rotary switch need not be on cross shafts but are preferably mounted directly on shaft 3 as is double contact switch 55.

In the FIG. 2 circuit of the invention, the control switch for electromagnetic clutch 2 is solenoid-operated switch 54. This switch is closed by linkage 56 upon the energizing of solenoid 53 through wires 62, 63 by a pulse across contacts 40 and 41, so that the electromagnetic clutch circuit is closed (through wire 66) simultaneously with the releasing of stop member 8 from the shutter actuator 5, 18. Therefore, at the same time as the shutter actuator starts its operation of the shutter, the electromagnetic clutch 2 begins to engage so that rotation of shaft 3 soon starts, thereby initiating the tensioning of shutter spring 6; therefore, the recycling of the shutter tension spring is not delayed until after the shutter has completely fired or run down. On the contrary, although the inertia of control shaft 3 and the associated parts, as well as the energizing lag of electromagnetic clutch 2, causes a certain delay, the tensioning of spring 6 can even somewhat overlap the shutter actuator movement. Thus, the pulse across terminals 40 and 41 starts the electromagnetic clutch's engagement simultaneously with the initiation of the shutter movement so that the spring can be fully tensioned at a time considerably less than that required in the prior art (FIG. 1) arrangement, since in the prior art arrangement the shutter spring 6 does not start to tension until the shutter actuator has completed its movement, the electromagnetic clutch parts have engaged, and the inertia of the whole control system (i.e., shaft 3, switches 10, 11 and 12) has been overcome.

Another simplification of the inventive system is that the two rotary switches 10 and 11 (which perform the function of holding the electromagnetic clutch closed until the spring has totally been rewound) may be replaced by one double-contact switch 55, which controls the circuit through wires 31, 65, and 24. This rotary contact holding switch 55 performs the function of de-energizing electromagnetic clutch 2 at the correct (i.e., 180° rotation) point in the cycle and does not have to perform the more complicated functions of timing both half cycles as did the prior art switches 10, 11 of FIG. 1. Further, since this switch is in parallel with pulse operated switch 54, switch 54 may be actuated independently of the position of rotary switch 55. Therefore, should the control shaft 3 stop in a position other than one of its 180° natural stopping positions, the simple expedient of supplying an additional pulse across elements 40 and 41 will reenergize the electromagnet until the correct position is reached. Similarly, since the circuit through solenoid 53 is independent of the rotary switch 12 (which only times the releasing of the stop element 8 by electromagnet 9), a pulse across 40, 41 will advance the entire mechanism to its next stopping position even though this switch (12) also is in an inbetween position due to malfunctioning of mechanical parts. Since solenoid 53 and switch 54 are completely independent of the position of shutter actuator 5 and its segment 18, it is obvious that a malfunctioning of the shutter or the shutter actuator iself will not affect the next exposure in such a manner as to make the entire shutter drive inoperable. Thus, the apparently simple expedients utilized in FIG. 2 occasion a great change in the speed of operation, simplify and reduce in number the mechanical elements, and eliminate all the break-down possibilities of the prior art system of FIG. 1.

So successful is the inventive system that a repetitive still camera utilizing the circuit arrangement illustrated in FIG. 2 has been manufactured in which ten pictures per second may be taken by applying this number of evenly spaced pulses across contacts 40 and 41. This is twice as fast as the five picture per second maximum speed obtainable with substantially the same camera utilizing the prior art (FIG. 1) arrangement. The cost of manufacture of the new arrangement is also less because of the elimination of switches 21 and 22 and the simplificaiton into a single double rotary switch (55) of the two switches 10 and 11; and the inconvenience of mechanical malfunction has been minimized by the ability of the dual control circuit arrangement to reset itself upon the receiving of another pulse, even though it is in an inoperative or "breakdown" position when the pulse is received. Thus control shaft 3 will be rotated to a normal stopping position by a pulse across solenoid 53 even though it is in an intermediary breakdown position when the pulse is received since double rotary switch 55 still performs the function of stopping the mechanism at the right moment.

The invention therefore accomplishes the three desired results enumerated earlier and does so without causing any deleterious effects in the other operations of the control mechanism. Since not only simplification but actual reduction in cost is also occasioned by the invention, it can readily be seen why the new control circuit has proved superior to the old one exemplified by the prior art disclosure.

Although the inventive control circuit has been shown as incorporated in a particular prior art shutter actuator system, it is obvious that the invention is not so limited. On the contrary, it can be utilized in many other control circuit arrangements utilizing different types of shutter actuators and, in fact, may be utilized in control arrangements not even involving shutters of the single stroke type. Therefore, the invention is not limited to the specific details of the prior art environment illustrated, but rather is defined solely by the following claims.

I claim:

1. In a control circuit arrangement for electrically operated photographic cameras of the type in which a constantly operating motor sometimes drives a control shaft through a switch-engaged electromagnetic clutch, said control shaft being operatively connected to a shutter actuator through an energy-storing means which therefore sometimes biases said shutter actuator toward an exposure-taking position, said actuator being normally held in inoperative position by a stop means, which is electrically releasable at times to allow said energy-storing means to operate said actuator to effect an exposure; the improvement which comprises: a conjoint electric control means operatively connected to said stop means and said electromagnetic clutch, said conjoint electric control means being of such construction that electrical actuation thereof will release said stop means and simultaneously switch said electromagnetic clutch to its engaging position, thereby initiating the exposure-taking operation of said shutter actuator and, at the same time, starting the engagement of said electromagnetic clutch to drivingly connect said motor and said control shaft, so as to begin the storing of energy for the next exposure in said energy-storing means as early as feasible.

2. A circuit arrangement according to claim 1 in which said conjoint electric control means comprises two electromagnetic means, the first energizing said electromagnetic clutch and the second releasing said stop means, the circuit through said first electromagnetic means being independent of the position of said control shaft, and a switch, which is opened and closed by operative connection to said control shaft, in said circuit through said second electromagnetic means, so that the withdrawal of said stop means can be effected by said second electromagnetic means only upon substantial completion of the storing of energy in said energy-storing means.

3. A circuit arrangement according to claim 2 in which the circuits through said first and second electromagnetic means are connected in parallel so as to be capable of actuation by a single electrical pulse.

4. A circuit arrangement according to claim 1 in which said conjoint electric control means comprises a switching circuit means for engaging said electromagnetic clutch and an electromagnetic retracting means for releasing said stop means, said clutch switching circuit means comprising a solenoid-actuated switch and a parallel holding switch, said holding switch being operatively connected to said control shaft and of such construction as to close upon initial rotation of said shaft but to open upon a predetermined additional rotation of said control shaft, so that momentary closing of said solenoid-actuated switch will close said switching circuit to engage said clutch and start rotation of said control shaft, thereby causing said holding switch to retain the clutch in engaged position, but causing said holding switch to open and therefore disconnect said control shaft from said motor after the control shaft has completed said predetermined rotation.

5. A circuit arrangement according to claim 4 in which said holding switch is a rotary switch having two open positions connected by circuit-closing contacts so as to open the circuit to said electromagnetic clutch twice for each rotation of said control shaft, thereby being suited for use with a shutter actuator which is biased and released twice per control shaft rottaion.

6. In a control arrangement for photographic cameras of the type in which a constantly operating motor sometimes drives a control shaft through an engageable clutch, said control shaft being operatively connected to a shutter actuator through an energy-storing means which therefore sometimes biases said shutter actuator toward an exposure-taking position, said shutter actuator being normally held in inoperative position by a stop means, which is releasable at times, thereby to allow said energy-storing means to operate said actuator so as to effect an exposure, the improvement which comprises: a conjoint control means, operatively connected to said stop means and clutch, said conjoint control means being of such construction that actuation thereof will release said stop means and simultaneously cause said clutch to engage; thereby initiating the exposure-taking operation of said shutter actuator and, at the same time, starting the engagement of said clutch to drivingly connect said motor and said control shaft, so as to begin the storing of energy for the next exposure in said energy-storing means as early as feasible, said conjoint control means comprising two separate operating means, the first one for engaging said clutch and the second for releasing said stop means, the position of said first clutch-engaging operating means being independent of the position of said control shaft, but at least part of said second stop-releasing operating means being operatively connected to said control shaft in such a manner as to allow actuation of said stop-releasing operating means and, therefore, the withdrawal of said stop means only upon substantial completion of the storing of energy in said energy-storing means.

References Cited in the file of this patent
UNITED STATES PATENTS

| | | |
|---|---|---|
| 2,160,818 | Becker | June 6, 1939 |
| 2,256,207 | Leitz | Sept. 16, 1941 |